UNITED STATES PATENT OFFICE.

GEORGE AUSTIN SCHROTER, OF DENVER, COLORADO, ASSIGNOR OF ONE-HALF TO THOMAS LOWTHIAN, OF SAME PLACE.

EXTRACTION OF PRECIOUS METALS.

SPECIFICATION forming part of Letters Patent No. 559,614, dated May 5, 1896.

Application filed April 1, 1895. Serial No. 544,048. (No specimens.)

*To all whom it may concern:*

Be it known that I, GEORGE AUSTIN SCHROTER, a citizen of the United States, residing at Denver, in the county of Arapahoe and State of Colorado, have invented certain new and useful Improvements in the Extraction of Precious Metals from Ores and Metallurgical Products; and I do hereby declare the following to be a full, clear, and exact description of the invention, such as will enable others skilled in the art to which it appertains to practice the same.

The object of my invention is to extract from ores and metallurgical products a large percentage of the precious metals which they contain at comparatively small expense, and I believe that with my process I can extract from most ores a larger percentage of the said metals at a less cost than by any other previously-known process.

My process is essentially a silver process; but in its practice a fair percentage of gold, if there be any in the ore, is either removed or left in the ore in such condition that it can be recovered by the cheap chlorin and bromin methods.

My process consists, essentially, in leaching crushed and chloridized ore or metallurgical products with hot acidulated brine to which has been added from one-half to four per cent., more or less, by weight, of sulfate of copper or some equivalent soluble salt of copper. With most ores this step, which I believe to be novel in itself, is preferably preceded by leaching the ore with hot acidulated brine, and it is also preferably followed by again leaching the ore with hot acidulated brine. Whether or not one or both of the steps last mentioned shall be employed will depend upon the character of the ore, and in many cases it can only be determined by experiment.

The complete process, including the preliminary preparation of the ore, as successfully practiced by me is as follows:

The ore is first crushed to a degree of fineness which will free the mineral particles. If the silver in the ore is principally in the form of a chlorid, I proceed at once to the first leaching operation hereinafter described; but if the silver is largely in combination with sulfur, arsenic, or antimony, or is in any form except the chlorid of silver, the ore should be first chloridized in the usual manner—viz., by roasting it with salt. The chloridized ore is then placed in leaching-vats, the construction of which is well-known. For commercial operations these vats are made large enough to contain from ten to twenty tons of crushed and chloridized ore. If the ore contains a large per cent. of soluble base-metal salts—say ten per cent. or over—I prefer to first leach the ore with hot water for the purpose of dissolving out much of the soluble base-metal salts. If the soluble base-metal salts were not dissolved out by the hot water, the brine used in the next operation would dissolve some of them, and consequently it could not dissolve as much of the silver chlorid as it does, and, moreover, the brine would be so impure after the silver had been precipitated, as hereinafter described, that the cost of purifying it so that it could be used again would be greatly increased. These preliminary operations above referred to are commonly practiced in other processes.

When the ore has been treated in accordance with the above directions, I pour upon the ore in the vats a hot acidulated solution of brine, using for this purpose ten to twenty cubic feet of concentrated brine to each ton of ore. The brine used may be made by dissolving one part of salt in two and one-half parts of water, by weight. To acidulate the brine, I may use from one-tenth to one per cent. of sulfuric or any inorganic acid. This solution is permitted to leach through the ore slowly for about three to four hours, the result being that a very considerable quantity of the chlorid of silver is dissolved and carried away by the brine. I am aware that this operation taken by itself is old, being part of the process known as "Augustin's process." It is not, however, necessary in all cases that this operation should be gone through with; but it is desirable in most cases, for it dissolves out a large quantity of the silver chlorid, which is recovered in the well-known way; but there is a limit to the amount of silver which can be practically and profitably extracted by hot acidulated brine alone. When this limit is reached, although additional quantities of brine may be caused to leach through the ore, the amount of silver extracted or dissolved by this brine will be so small that it will not pay for the cost of the additional leaching.

The next and the essential step in my process is leaching the same ore with hot acidulated brine to which has been added from one-half to four per cent., more or less, of sulfate of copper—for example, the carbonate, acetate, or nitrate of copper, or some other equivalent salt of copper. In this operation I use substantially the same quantity of solution relative to the weight of ore as in the first step named and continue this leaching operation for about three hours, more or less. Although, as before stated, no considerable quantity of silver could have been extracted from the ore by continuing to leach it with hot acidulated brine alone, nevertheless the solution of brine containing the copper salt will dissolve and carry away a large quantity of silver in the form of silver chlorid. The addition of sulfate of copper to the brine results in certain chemical reactions, in which the insoluble compounds of silver with sulfur, antimony, arsenic, and other elements are destroyed and the silver chlorid is formed, which chlorid is immediately dissolved in the brine of the solution. What these reactions will be exactly will of course depend upon the character and chemical composition of the ore being acted upon; but the products of the reaction, in addition to the silver chlorid, will generally be sulfate of sodium and sulfid of copper and some free sulfur, while the arsenic, antimony, or other elements contained in the ore make new combinations, generally with the sulfur to form sulfids.

The next step consists in leaching the same ore with hot acidulated brine, using about the same quantity as in the first step and continuing the operation for two or three hours, more or less. Although no considerable quantity of silver could have been extracted from the ore by the continued use of acidulated brine alone before the ore had been leached with the brine containing sulfate of copper, yet after the ore has been so treated a hot acidulated brine will dissolve out of said ore a profitable quantity of silver. This may be perhaps accounted for upon the supposition that the sulfate of copper used with the brine in the second leaching operation decomposes more of the insoluble silver compounds than the brine which forms a part of said solution can dissolve. It may also be true that in the decomposition of said insoluble silver compounds some of the silver chlorids contained in the ore which were theretofore covered are exposed to the action of the last solution of brine; but whatever be the explanation it is true that with most ores the second step may profitably be followed by a third step precisely like the first—to wit, leaching the ore with hot acidulated brine—and that this third step will extract such a quantity of silver as will render this operation profitable.

The silver contained in each of the solutions after the three leaching operations described may be recovered in the usual manner by being precipitated in suitable boxes by means of copper.

In the foregoing description it will be seen that the novel and essential operation of this process consists in leaching the ore with brine to which soluble copper salt has been added, and there are ores—which must be determined by experiment—from which silver may be profitably extracted by the use of this step alone; but in cases where the ore is pretty thoroughly chloridized, either naturally or artificially, a considerable percentage of the silver may be best extracted by the preliminary leaching of the ore with hot acidulated brine, and in most cases it is also found that after the ore has been leached with the brine and copper salt it is left in such condition that a very considerable amount of silver may be recovered by again leaching the ore with hot acidulated brine. It is impossible to give any specific directions as to when one should and when one should not use either the preliminary or subsequent leaching with the brine alone. That must be determined by experiment with the different kinds of ores; but as a general proposition it may be stated that the most profitable results are secured by employing the three operations named, to wit: first, leaching the ore with hot acidulated brine; second, leaching the ore with hot acidulated brine to which the soluble copper salt has been added, and, third, again leaching the ore with hot acidulated brine.

Although the process described is primarily a silver one, it has these points of superiority over other leaching processes, viz: First, a very considerable percentage of the gold, if there be any in the ore, is carried away in the second and third solutions in the form of chlorid of gold, which is recovered in the precipitation-boxes with the silver, and, second, a very large percentage of gold which remains in the ore is left in such form and in such combinations that it may be recovered by the cheap chlorin and bromin methods well known, because the ore contains no counteracting chemicals.

I have heretofore stated that from one-half to four per cent. of sulfate of copper should be used in the brine in the second step of the described process. I do not, however, intend to limit the scope of my claims to these precise proportions. I name these percentages because in my experiments I have found that within these limits most satisfactory results are obtained; but different ores require, to obtain the best results, different proportions of the soluble copper salt, and perhaps a percentage of the copper salt greater or less than those named may in some cases be used. I know of no way of determining what is the best proportion in any case except by experiment upon the particular ore to be operated upon.

Heretofore I have stated that the brine which is used in the several operations should be hot (about 212° Fahrenheit) and acidulated. The brine is used hot because it dissolves more of the silver chlorid than it does when cold, and it is so acidulated because the silver is precipitated from the solution by copper more quickly and completely than it would be if the brine were not acidulated. Some results can be secured by using cold brine not acidulated, but the results will be far inferior to those obtained by using the brine as hereinbefore directed.

Having described my invention, I claim—

1. The herein-described process of extracting precious metals, particularly silver, from ores and metallurgical products, which consists in leaching the crushed and chloridized ore with a concentrated solution of brine to which has been added a small per cent. (one-half to four per cent. approximately) of a soluble salt of copper, substantially as specified.

2. The herein-described process of extracting precious metals, particularly silver, from ores and metallurgical products, which consists first, in leaching the crushed and chloridized ore or product in a concentrated solution of brine, and second, in again leaching it with a concentrated solution of brine to which has been added a small percentage (from one-half to four per cent. approximately) of a soluble salt of copper, substantially as specified.

3. The herein-described process of extracting precious metals, particularly silver, from ores and metallurgical products, which consists in first, leaching the crushed and chloridized ore with brine; second, leaching the ore with brine to which has been added a soluble salt of copper, as for example, copper sulfate; and, third, leaching the ore with brine, substantially as and for the purpose specified.

4. The herein-described process of extracting precious metals, particularly silver, from ores and metallurgical products, which consists in first, leaching the crushed and chloridized ore with hot acidulated brine; second, leaching the ore with hot acidulated brine to which has been added a soluble salt of copper, as for example, copper sulfate; and, third, leaching the ore with hot acidulated brine, substantially as and for the purpose specified.

In testimony whereof I affix my signature in presence of two witnesses.

GEORGE AUSTIN SCHROTER.

Witnesses:
O. P. POSEY,
CHARLES H. TOLL.